United States Patent [19]

Lenz et al.

[11] Patent Number: 4,793,243

[45] Date of Patent: Dec. 27, 1988

[54] SUPPLEMENTARY WORT REMOVAL DEVICE IN LAUTER TUNS

[76] Inventors: Bernhard Lenz, Schwarzacher Str.51; August Lenz, Am Eselsberg 7a, both of D-8710 Kitzingen, Fed. Rep. of Germany

[21] Appl. No.: 79,896

[22] Filed: Jul. 31, 1987

[30] Foreign Application Priority Data

Aug. 23, 1986 [DE] Fed. Rep. of Germany ....... 3628726

[51] Int. Cl.⁴ .............................................. C12C 7/10
[52] U.S. Cl. ................... 99/277.1; 99/276; 99/277; 99/278; 426/16; 426/478
[58] Field of Search ....................... 99/276, 277, 277.1, 99/277.2, 278; 426/16, 29, 600, 478, 489

[56] References Cited

U.S. PATENT DOCUMENTS

| | | | |
|---|---|---|---|
| 2,758,030 | 8/1956 | Metz | 426/478 X |
| 2,916,421 | 12/1959 | Schwaiger et al. | 99/278 X |
| 3,811,372 | 5/1974 | Lenz | 99/277.1 |
| 4,234,615 | 11/1980 | Krueger | 426/478 |
| 4,289,793 | 9/1981 | Gustafson et al. | 426/478 X |

FOREIGN PATENT DOCUMENTS 2035955 2/1972 Fed. Rep. of Germany ..... 99/277.1

1338331 4/1962 France ................... 99/276

Primary Examiner—Timothy F. Simone
Assistant Examiner—Stephen F. Gerrity
Attorney, Agent, or Firm—Frank P. Presta

[57] ABSTRACT

A supplementary wort removal device in lauter tuns is provided, in order to avoid tight and solidly constructed discharge pipe assemblies with check valves for the wort, and the supplementary wort removal device preferably has a plurality of annularly segmented and vertically movable hollow members with screen walls, and the hollow members are open on the bottom. Preferably, the hollow members have a transverse section in the form of an inverted U or V. Before the pumping of the mash into the lauter tun, the hollow members are simply placed with their open bottoms on the screen and/or perforated floor of the lauter tun. The wort which is being discharged from the draff layer and flowing through the screen walls into the inside chambers of hollow members flows further through the open bottoms of hollow members directly through the screen and/or perforated floor of the lauter tun and into a collection chamber between the screen and/or perforated floor and the tun floor.

8 Claims, 2 Drawing Sheets

SUPPLEMENTARY WORT REMOVAL DEVICE IN LAUTER TUNS

BACKGROUND OF THE INVENTION

The present invention relates to a supplementary wort removal device for the removal of wort in lauter tuns, consisting of at least one hollow member with screen walls arranged vertically movable over the screen and/or perforated floor of the lauter tun and means for removal of the wort from the hollow member.

In the process of the production of beer, following the cooking process the mash is pumped into a lauter tun, which is provided with a screen and/or perforated floor, in order to separate the solid components from the liquid. During the refining, a layer of draff is deposited on the screen and/or perforated floor, which functions as a filter layer for the wort being discharged through the perforated floor. In order to increase the filtering effect of these devices, "vertical refining" has already been introduced into the process (see Brauereikatechismus by Dworsky-Lense, 7th edition, 1940, Sec. 65 page 129). With this system an auxiliary wort removal device in the form of a hollow member is provided with screen walls, which can be moved vertically by a hoist device suspended on the cover of the lauter tun by means of cables. Before pumping in the mash, this wort removal hollow member is moved away such a distance that it comes to engage in the draff layer which is being formed. The removal of the wort from this hollow member then occurs through a central pipe, which can be slid on a rigid valve-controlled wort removal flow line. This type of auxiliary wort removal thus requires a corresponding extensive structural outlay and further limits the flexibility of the wort removal system.

German Pat. Nos. 1,080,951 and 2,035,955 disclose other known auxiliary wort removal devices constructed so as to be attached tightly to or incorporated into the lauter tun, which nonetheless also require extra discharge pipes and check valves and also are found in the layer of draff not only during the process of obtaining the head of the wort, but also during the washing out of the grains in the draff layer with water, which can lead to a decrease of the yield. Furthermore, these devices lack the desired flexibility as a result of the tight attachment or incorporation.

SUMMARY OF THE INVENTION

The object of the present invention is to provide a supplementary wort removal device in lauter tuns in the form of vertically movable hollow members with screen walls, which is of simple construction and can be used in many ways.

According to the present invention, this is attained in that the hollow member is open on the bottom and is placed with this open bottom on the screen and/or perforated floor of the lauter tun for the purpose of wort removal from its inside chamber. Thus it is possible to operate without outward flowing discharge pipes and check valves, since the wort penetrating into the hollow member through its open bottom can be discharged through the screen and/or perforated floor. The structural outlay for this supplementary wort removal device according to the invention is thus considerably lower in comparison with the state of the art. Since fixed discharge pipe arrangements are not required, the hollow member according to the invention can be placed and moved on and from any desired point on the screen and/or perforated floor and the dimensions of its filter surfaces (screen walls) can be adapted simply to the relevant conditions.

As a result of the invention a higher filter coefficient is also attained. If mash is pumped into the lauter tun at the beginning of a settling process, it flows around the hollow member placed with its open bottom on the screen and/or perforated floor along its screen walls, on which the grains build up filter layers. The wort penetrates through these filter layers and through the screen walls into the inside chamber of the hollow member and then, as already described, runs through its open bottom through the perforated floor to the outside. It can be advantageous that the hollow member be raised up with water during the extraction process and also for cleaning. When it is raised the supplementary wort removal device according to the invention also does not disturb the operation of an optional chopping device for the layer of draff. The hollow member can also be arranged outside the path of a chopping device.

Different configurations of the invention arise from the dependent claims. The hollow member, viewed in cross section, is generally in the shape of an inverted U or V.

Discharge of the wort from the inside chamber of the hollow member through the perforated floor is further improved when, according to another configuration of the invention, the bottom edges of the hollow member intended for resting upon the screen and/or perforated floor are angled outwardly. Thus the perforated floor surface covered by the hollow member and intended for the wort discharge from its inside chamber is of greater dimensions.

According to still another development of the invention, it is advantageous that the height of the hollow member be approximately ¾ the height of the layer of grains.

According to still another configuration of the invention, the hollow member is configured to be circular in a known manner and arranged concentrically within the lauter tun.

When, according to another development of the invention, the circular hollow member has such a spacing from the lauter tun wall that an intermediate space of sufficient dimensions is present for formation of the draff layer even in the area between the lauter tun wall and the outside wall of the hollow member, the filter capacity of the wort removal device according to the invention is even further improved.

Relative to the production and assembly, a simplification is attained if the circular hollow member is subdivided into a plurality of segments. In this case it is then recommeded that, according to still another development of the invention, the annular segments of the hollow member can be moved up and down independently from one another.

Still another incremental increase of the filter capacity can be attained in that a plurality of circular or annular segmented hollow members be provided in concentric arrangement and mutually uniform spacing in the lauter tun.

The hollow member or members can be moved upwardly and downwardly by pneumatic operation cylinders, which are mounted on the wall of the lauter tun.

BRIEF DESCRIPTION OF THE DRAWINGS

The invention is now to be explained relative to the drawings of exemplary embodiments, wherein.

DESCRIPTION OF THE PREFERRED EMBODIMENTS

Figure 1:
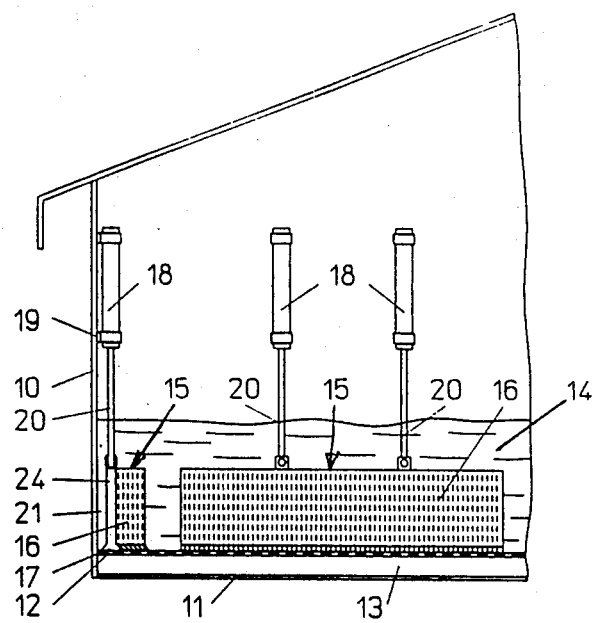
FIG. 1 is a partial side elevational view of a part of a lauter tun with a supplementary wort removal device constructed according to the present invention, of which the hollow members are placed on the perforated floor of the lauter tun.
Figure 2:
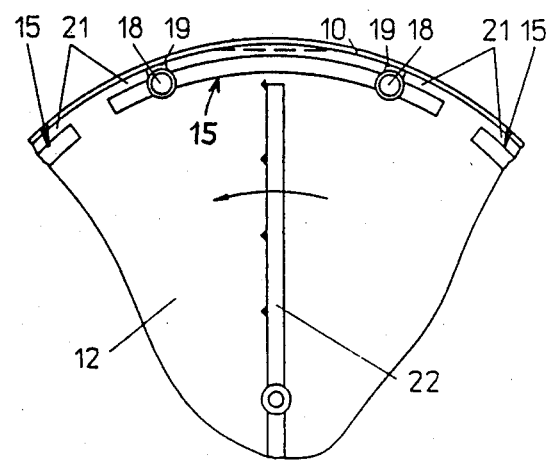
FIG. 2 is an enlarged plan view of a section of the lauter tun shown in FIG. 1, in which a part of a chopping device for the draff layer is indicated diagrammatically.
Figure 3:
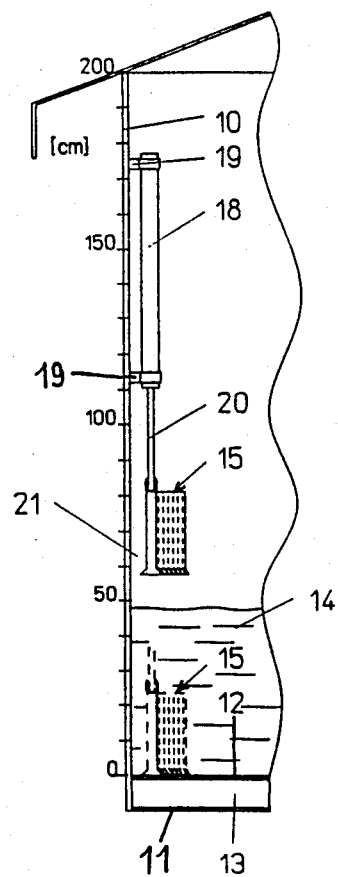
FIG. 3 is another partial side elevational view of a lauter tun, in which a hollow member of the supplementary wort removal device contructed according to the present invention is shown in full lines in its lifted up, inoperable position and in broken lines in its work position on the perforated floor of the lauter tun.

The lauter tun which is shown partially in FIGS. 1 to 3 for the collection of wort during the production of beer has a circular tun wall 10, a tun floor 11 and a screen and/or perforated floor 12 arranged over tun floor 11 and supported at some distance therefrom by a suitable support device (not shown). The screen and/or perforated floor 12 forms a horizontal screen surface for the separation of the solid from the liquid components of the mash which is pumped into the lauter tun. The space 13 between screen and/or perforated floor 12 and tun floor 11 forms the collection chamber for the wort being discharged through the draff layer 14, which then flows downwardly through pipes (not shown) for further processing. The solid components of the mash from draff layer 14 which is being deposited on screen and/or perforated floor 12, which serves simultaneously as a filter layer for the wort which is being discharged.

Figure 4:
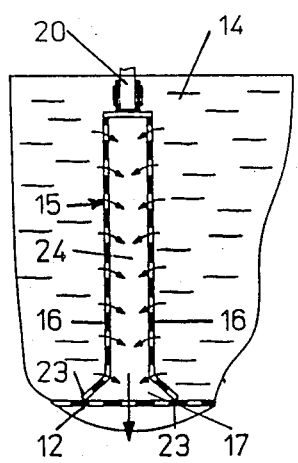
FIG. 4 is an enlarged, partial end elevational view in section of one embodiment of the hollow member of the wort removal device placed on the perforated floor.

To increase the filter capacity, a supplementary wort removal device with vertical screen surfaces is provided in the lauter tun. In an exemplary embodiment, this device comprises a series of annularly segmented hollow members 15, of which the side walls are configured as screen walls 16 and of which the bottom 17 (FIG. 4) is open. The top and both outside walls of hollow member 15 are closed in the exemplary embodiment, but they could also be slotted or perforated, in order to provide additional screen surface.

Each hollow member 15 can be moved up and down, for example, by two synchronously operating pneumatic operation cylinders 18, and the distance of the lift is determined so that each hollow member 15 can be raised completely out of draff layer 14, as is indicated in unbroken lines in FIG. 3. Pneumatic operation cylinders 18 may be fastened by means of suitable holders 19 to lauter tun wall 10 at some distance therefrom. Their piston rods 20 carry hollow member 15. Pneumatic operation cylinders 18 could be controlled with compressed air with a thrust which is controlled so that annularly segmented hollow members 15 could be moved up and down either simultaneously or else independently from one another.

FIG. 2 shows especially clearly that annularly segmented hollow members 15 are arranged concentrically with and at a certain distance from lauter tun wall 10. This spacing is determined so that draff layer 14 can be formed even in spaces 21 between lauter tun wall 10 and the outside surface of hollow members 15. Furthermore, the arrangement of annularly segmented hollow members 15 is such that they do not hinder the work processes of a traditional, optionally present chopping device for chopping draff layer 14, which is indicated diagrammatically and partially in FIG. 2 at 22.

Before the pumping of the mash into the lauter tun, annularly segmented hollow members 15 are placed by operation cylinders 18 with their open bottoms 17 on screen and/or perforated floor 12, so that the bottom edges 23 of their screen walls 16 come into engagement with the top of screen and/or perforated floor 12. Bottom edges 23 of screen walls 16 of each hollow member 15 are angled outwardly in the exemplary embodiments of FIGS. 1 to 4 and could likewise be provided with rubber packing strips (not shown).

During the settling process, the front wort runs through draff layer 14 forming a filter downwardly through screen and/or perforated floor 12 into collection chamber 13. Since draff layer 14 also comes up around lowered hollow members 15, additional front wort flows through both screen walls 16 of each hollow member 15 into its inside chamber 24 and from there through open bottom 17 of each hollow member 15 through screen and/or perforated floor 12 downwardly into collection chamber 13. Screen walls 16 thus form support surfaces for the adjacent draff layer 14. During the washing out of draff layer 14 with water, hollow members 15 are removed from draff layer 14 and brought into the starting position shown in FIG. 3 in unbroken lines.

Figure 5:
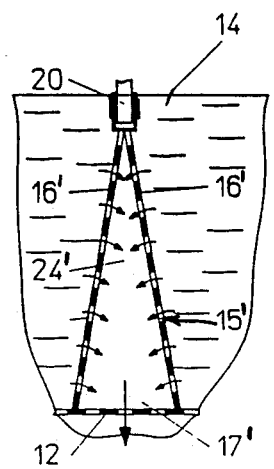
FIG. 5 is an enlarged, partial end elevational view in section of another embodiment of the hollow member of the wort removal device placed on the perforated floor.

FIG. 5 shows an alternative sectional shape for hollow members 15', which in this case is the shape of an inverted V. Here also the front wort can flow in through screen walls 16' into inside chamber 24' of hollow member 15' and from there can flow out through its open bottom 17' through screen and/or perforated floor 12 into collection chamber 13 of the lauter tun.

The height of annularly segmented hollow member 15 preferably is approximately ¾ the height of draff layer 14.

Instead of the numerous annularly segmented hollow members 15, a one-part circular hollow member with open bottom could be provided and it is also possible, to further increase the filter surface, to arrange a plurality of circular hollow members concentrically and with mutual radial spacing in the lauter tun (not shown). Within the scope of the invention, however, are included still other base and sectional shapes for the hollow members for additional wort removal. It is then stipulated that the hollow members always have an open bottom, in order to facilitate the direct wort discharge from the inside chamber through screen and/or perforated floor 12 of the lauter tun.

What is claimed is:

1. In a lauter tun having a tun wall and a perforated floor, a supplementary wort removal device comprising at least one hollow member with an inner screen wall and an outer screen wall, and an inside chamber formed between said screen walls, said at least one hollow member being arranged vertically movable over the perforated floor of the lauter tun, said tun wall and said outer screen wall forming an area therebetween, and means for removal of the wort from the hollow member, characterized in that the hollow member (15) has an open bottom (17) and is placed with this open bottom (17) on the perforated floor (12) of the lauter tun for the purpose of removal of the wort from said inside chamber (24), said hollow member being of substantially circular configuration and being arranged substantially concentrically in the lauter tun, said hollow member comprising a plurality of circumferential segments that are movable up and down independently of one another, and actuating means are mounted on said tun wall of the lauter tun for selectively moving said segments up and down.

2. Device as in claim 1, characterized in that the hollow member (15), viewed in cross section, corresponds to an inverted U-shape.

3. Device as in claim 1, characterized in that the hollow member (15), viewed in cross section, corresponds to an inverted V-shape.

4. Device as in claim 1, characterized in that the hollow member (15) has bottom edges (23) intended for placement on the perforated floor (12), said bottom edges being bent outwardly.

5. Device as in claim 1, characterized in that the lauter tun has a draff layer (14) therein, and the height of the hollow member (15) is approximately $\frac{3}{4}$ the height of the draff layer (14).

6. Device as in claim 1, characterized in that the circular hollow member (15) is at such a distance from the lauter tun wall (10) that an intermediate space (21) is present for formation of a draff layer (14) in said area between said lauter tun wall (10) and said outer screen wall of the hollow member (15).

7. Device as in claim 1, characterized in that a plurality of hollow members (15) are provided in concentric arrangement and at mutually uniform spacing in the lauter tun.

8. Device as in claim 1, wherein said actuating means are pneumatic operation cylinders.

* * * * *